US012595332B2

(12) United States Patent
Emmrich-Smolczyk et al.

(10) Patent No.: US 12,595,332 B2
(45) Date of Patent: Apr. 7, 2026

(54) PREPARATION OF POLYURETHANE SYSTEMS

(71) Applicant: Evonik Operations GmbH, Essen (DE)

(72) Inventors: Eva Emmrich-Smolczyk, Essen (DE); Mladen Vidakovic, Duisburg (DE); Stephan Wendel, Oldenburg (DE); Juan Jesus Burdeniuc, Colmar, PA (US)

(73) Assignee: Evonik Operations GmbH, Essen (DE)

( * ) Notice: Subject to any disclaimer, the term of this patent is extended or adjusted under 35 U.S.C. 154(b) by 1111 days.

(21) Appl. No.: 17/622,095

(22) PCT Filed: Jul. 13, 2020

(86) PCT No.: PCT/EP2020/069739
§ 371 (c)(1),
(2) Date: Dec. 22, 2021

(87) PCT Pub. No.: WO2021/013607
PCT Pub. Date: Jan. 28, 2021

(65) Prior Publication Data
US 2022/0411566 A1     Dec. 29, 2022

Related U.S. Application Data

(60) Provisional application No. 62/877,904, filed on Jul. 24, 2019.

(51) Int. Cl.
| | |
|---|---|
| *C08G 18/48* | (2006.01) |
| *C08G 18/18* | (2006.01) |
| *C08G 18/32* | (2006.01) |
| *C08G 18/38* | (2006.01) |
| *C08G 18/66* | (2006.01) |
| *C08G 18/76* | (2006.01) |
| *C08J 9/12* | (2006.01) |
| C08G 101/00 | (2006.01) |

(52) U.S. Cl.
CPC ..... *C08G 18/4829* (2013.01); *C08G 18/1833* (2013.01); *C08G 18/3275* (2013.01); *C08G 18/3834* (2013.01); *C08G 18/4816* (2013.01); *C08G 18/6688* (2013.01); *C08G 18/7671* (2013.01); *C08J 9/125* (2013.01); *C08G 2101/00* (2013.01); *C08G 2110/0008* (2021.01); *C08G 2110/0083* (2021.01); *C08J 2203/10* (2013.01); *C08J 2205/06* (2013.01); *C08J 2375/08* (2013.01)

(58) Field of Classification Search
CPC ............ C08G 18/1833; C08G 18/3275; C08G 18/3834; C08G 18/4816; C08G 18/4829; C08G 18/6688; C08G 18/7671; C08G 2101/00; C08G 2110/0008; C08G 2110/0083; C08J 9/125; C08J 2203/10; C08J 2205/06; C08J 2375/08
See application file for complete search history.

(56) References Cited

U.S. PATENT DOCUMENTS

| | | | |
|---|---|---|---|
| 3,933,695 | A | 1/1976 | Bothe |
| 4,042,540 | A | 8/1977 | Lammerting et al. |
| 4,147,847 | A | 4/1979 | Waddill et al. |
| 4,855,379 | A | 8/1989 | Budnik et al. |
| 5,306,707 | A | 4/1994 | Burkhart et al. |
| 5,321,051 | A | 6/1994 | Burkhart et al. |
| 5,357,018 | A | 10/1994 | Burkhart et al. |
| 5,756,557 | A | 5/1998 | Kimock et al. |
| 5,824,711 | A | 10/1998 | Kimock et al. |
| 5,844,010 | A | 12/1998 | Burkhart et al. |
| 5,874,483 | A | 2/1999 | Savoca et al. |
| 6,051,527 | A | 4/2000 | Savoca et al. |
| 6,114,403 | A | 9/2000 | Mercado et al. |
| 6,201,033 | B1 | 3/2001 | Mercado et al. |
| 6,232,356 | B1 | 5/2001 | Mercado et al. |
| 6,432,864 | B1 | 8/2002 | Wendel et al. |
| 6,525,107 | B1 | 2/2003 | Wendel et al. |
| 6,737,446 | B1 | 5/2004 | Burdeniuc |
| 6,747,069 | B1 | 6/2004 | Burdeniuc |
| 6,759,447 | B1 | 7/2004 | Burdeniuc et al. |
| 6,762,211 | B1 | 7/2004 | Burdeniuc |
| 6,825,238 | B2 | 11/2004 | Hohl et al. |
| 6,835,757 | B2 | 12/2004 | Burdeniuc |

(Continued)

FOREIGN PATENT DOCUMENTS

| | | |
|---|---|---|
| CN | 1800231 | 7/2006 |
| DE | 2 533 074 A1 | 3/1976 |

(Continued)

OTHER PUBLICATIONS

English International Search Report mailed on Sep. 23, 2020 in PCT/EP2020/069739 (2 pages).

(Continued)

*Primary Examiner* — John M Cooney

(74) *Attorney, Agent, or Firm* — Grüneberg Global IP, PLLC

(57) ABSTRACT

The invention relates to a process for producing polyurethanes using a component A comprising a polyhydrazide, a polysemicarbazide, a polysulfonyl hydrazide and/or carbodihydrazide, in particular a polyhydrazide, wherein the component A is employed in the form of a mixture C which further comprises a component B comprising a dispersion medium.

14 Claims, No Drawings

(56)  References Cited

U.S. PATENT DOCUMENTS

| | | | |
|---|---|---|---|
| 6,855,739 B2 | 2/2005 | Becker et al. | |
| 6,998,508 B2 | 2/2006 | Raymond et al. | |
| 7,026,512 B2 | 4/2006 | Raymond et al. | |
| 7,169,823 B2 | 1/2007 | Burdeniuc | |
| 7,189,765 B2 | 3/2007 | Burdeniuc et al. | |
| 7,192,990 B2 | 3/2007 | Burdeniuc | |
| 7,615,580 B2 | 11/2009 | Burdeniuc et al. | |
| 7,666,919 B2 | 2/2010 | Burdeniuc et al. | |
| 7,671,103 B2 | 3/2010 | Eilbracht et al. | |
| 7,671,104 B2 | 3/2010 | Heinemann et al. | |
| 7,838,566 B2 | 11/2010 | Glos et al. | |
| 7,872,055 B2 | 1/2011 | Burdeniuc et al. | |
| 8,143,321 B2 | 3/2012 | Burdeniuc et al. | |
| 8,258,198 B2 | 9/2012 | Andrew et al. | |
| 8,293,808 B2 | 10/2012 | Herrington et al. | |
| 8,367,870 B2 | 2/2013 | Burdeniuc et al. | |
| 8,445,555 B2 | 5/2013 | Burdeniuc et al. | |
| 8,530,534 B2 | 9/2013 | Burdeniuc et al. | |
| 8,552,077 B2 | 10/2013 | Burdeniuc et al. | |
| 8,580,864 B2 | 11/2013 | Burdeniuc et al. | |
| 8,618,014 B2 | 12/2013 | Andrew et al. | |
| 8,637,584 B2 | 1/2014 | Andrew et al. | |
| 9,133,306 B2 | 9/2015 | Vedage et al. | |
| 9,145,466 B2 | 9/2015 | Burdeniuc et al. | |
| 9,273,175 B2 | 3/2016 | Burdeniuc et al. | |
| 9,290,604 B2 | 3/2016 | Andrew et al. | |
| 9,334,382 B2 | 5/2016 | Burdeniuc et al. | |
| 9,447,223 B2 | 9/2016 | Burdeniuc et al. | |
| 9,708,436 B2 | 7/2017 | Burdeniuc et al. | |
| 9,765,009 B2 | 9/2017 | Burdeniuc et al. | |
| 9,815,932 B2 | 11/2017 | Burdeniuc et al. | |
| 9,878,317 B2 | 1/2018 | Burdeniuc et al. | |
| 9,878,318 B2 | 1/2018 | Burdeniuc et al. | |
| 9,890,236 B2 | 2/2018 | Burdeniuc et al. | |
| 9,944,836 B2 | 4/2018 | Vedage et al. | |
| 9,968,919 B2 | 5/2018 | Burdeniuc et al. | |
| 10,023,678 B2 | 7/2018 | Burdeniuc et al. | |
| 10,023,680 B2 | 7/2018 | Andrew et al. | |
| 10,023,681 B2 | 7/2018 | Burdeniuc et al. | |
| 10,023,682 B2 | 7/2018 | Burdeniuc et al. | |
| 10,023,683 B2 | 7/2018 | Bender et al. | |
| 10,059,823 B2 | 8/2018 | Burdeniuc et al. | |
| 10,081,700 B2 | 9/2018 | Burdeniuc et al. | |
| 10,100,141 B2 | 10/2018 | Burdeniuc et al. | |
| 10,100,148 B2 | 10/2018 | Emmrich-Smolczyk et al. | |
| 10,106,638 B2 | 10/2018 | Burdeniuc et al. | |
| 10,119,002 B2 | 11/2018 | Burdeniuc et al. | |
| 10,125,234 B2 | 11/2018 | Hoffman et al. | |
| 10,144,811 B2 | 12/2018 | Burdeniuc et al. | |
| 10,189,963 B2 | 1/2019 | Burdeniuc et al. | |
| 10,196,476 B2 | 2/2019 | Burdeniuc et al. | |
| 10,364,315 B2 | 7/2019 | Burdeniuc et al. | |
| 10,421,832 B2 | 9/2019 | Burdeniuc et al. | |
| 10,450,402 B2 | 10/2019 | Andrew et al. | |
| 10,464,876 B2 | 11/2019 | Burdeniuc et al. | |
| 10,472,459 B2 | 11/2019 | Burdeniuc | |
| 10,570,245 B2 | 2/2020 | Burdeniuc | |
| 10,590,228 B2 | 3/2020 | Guenther et al. | |
| 10,683,385 B2 | 6/2020 | Su et al. | |
| 10,696,777 B2 | 6/2020 | Burdeniuc et al. | |
| 10,759,892 B2 | 9/2020 | Leng et al. | |
| 10,815,351 B2 | 10/2020 | Burdeniuc et al. | |
| 10,988,566 B2 | 4/2021 | Burdeniuc et al. | |
| 10,995,174 B2 | 5/2021 | Emmrich-Smolczyk et al. | |
| 11,021,561 B2 | 6/2021 | Xi et al. | |
| 11,046,850 B2 | 6/2021 | Bender et al. | |
| 11,098,198 B2 | 8/2021 | Burdeniuc et al. | |
| 11,104,757 B2 | 8/2021 | Burdeniuc et al. | |
| 11,208,519 B2 | 12/2021 | Burdeniuc et al. | |
| 2004/0198851 A1 | 10/2004 | Becker et al. | |
| 2005/0267227 A1 | 12/2005 | Andrew et al. | |
| 2006/0141236 A1 | 6/2006 | Nakamura et al. | |
| 2006/0167125 A1 | 7/2006 | Bauer et al. | |
| 2007/0072951 A1 | 3/2007 | Bender et al. | |
| 2007/0270518 A1 | 11/2007 | Nutzel | |
| 2008/0312351 A1 | 12/2008 | Burdeniuc et al. | |
| 2012/0184639 A1 | 7/2012 | Haas et al. | |
| 2014/0221518 A1 | 8/2014 | Emmrich-Smolczyk et al. | |
| 2016/0075817 A1 | 3/2016 | Burdeniuc et al. | |
| 2016/0304685 A1 | 10/2016 | Emmrich-Smolczyk et al. | |
| 2018/0214857 A1 | 8/2018 | Burdeniuc et al. | |
| 2021/0214488 A1 | 7/2021 | Emmrich-Smolczyk et al. | |
| 2022/0033603 A1 | 2/2022 | Burdeniuc et al. | |
| 2022/0144996 A1 | 5/2022 | Burdeniuc et al. | |

FOREIGN PATENT DOCUMENTS

| | | | |
|---|---|---|---|
| DE | 4 229 402 A1 | 3/1994 | |
| DE | 4 239 054 A1 | 5/1994 | |
| DE | 10 003 156 A1 | 8/2001 | |
| DE | 10 258 046 A1 | 6/2004 | |
| DE | 10 2004 001 408 A1 | 7/2005 | |
| DE | 10 2009 047 846 A1 | 3/2011 | |
| EP | 0 493 836 A1 | 7/1992 | |
| EP | 0 533 202 A1 | 3/1993 | |
| EP | 0 780 414 A2 | 6/1997 | |
| EP | 0 839 852 A2 | 5/1998 | |
| EP | 0 867 465 A1 | 9/1998 | |
| EP | 1 161 474 B1 | 4/2004 | |
| EP | 1 537 159 A1 | 6/2005 | |
| EP | 1 544 235 A1 | 6/2005 | |
| EP | 1 678 232 A2 | 7/2006 | |
| EP | 1 712 578 A1 | 10/2006 | |
| EP | 3 459 983 A1 | 3/2019 | |
| JP | H10-36681 | 2/1998 | |
| WO | 00/47647 A1 | 8/2000 | |
| WO | 00/58383 A1 | 10/2000 | |
| WO | 01/23451 A2 | 4/2001 | |
| WO | 03/018660 A1 | 3/2003 | |
| WO | 2004/020497 A1 | 3/2004 | |
| WO | 2005/033167 A2 | 4/2005 | |
| WO | 2005/085310 A2 | 9/2005 | |
| WO | 2005/118668 A1 | 12/2005 | |
| WO | WO-2006047746 A1 * | 5/2006 | ......... C08G 18/0823 |
| WO | 2009/117479 A2 | 9/2009 | |
| WO | 2013/156237 A2 | 10/2013 | |
| WO | 2016/061068 A1 | 4/2016 | |
| WO | 2016/178793 A1 | 11/2016 | |

OTHER PUBLICATIONS

German language International Search Report mailed on Sep. 23, 2020 in PCT/EP2020/069739 (3 pages).
German language Written Opinion mailed on Sep. 23, 2020 in PCT/EP2020/069739 (pages).
Modro et al., U.S. Appl. No. 17/367,456, filed Jul. 5, 2021.
Burdeniuc et al., U.S. Appl. No. 17/639,218, filed Feb. 28, 2022.
Emmrich-Smolczyk et al., U.S. Appl. No. 17/622,095, filed Jul. 13, 2020.

* cited by examiner

PREPARATION OF POLYURETHANE SYSTEMS

CROSS REFERENCE TO RELATED APPLICATIONS

This application is a 35 U.S.C. § 371 U.S. national phase entry of International Application No. PCT/EP2020/069739 having an international filing date of Jul. 13, 2020, which claims the benefit of U.S. Provisional Application No. 62/877,904 filed Jul. 24, 2019, each of which is incorporated herein by reference in its entirety.

FIELD

The invention is in the field of polyurethanes and relates in particular to a process for producing polyurethane systems by reacting at least one polyol component with at least one isocyanate component in the presence of one or more catalysts which catalyze the isocyanate-polyol and/or iso-cyanate-water and/or isocyanate trimerization reactions, wherein the reaction is performed in the presence of a component A comprising a polyhydrazide, a polysemicar-bazide, a polysulfonyl hydrazide and/or carbodihydrazide, in particular a polyhydrazide, and correspondingly produced polyurethane systems.

BACKGROUND

Polyurethane systems in the context of the present invention are for example polyurethane coatings, polyurethane adhesives, polyurethane sealants, polyurethane elastomers or, in particular, polyurethane foams.

On account of their exceptional mechanical and physical properties polyurethanes find use in a very wide variety of sectors. A particularly important market for a very wide variety of polyurethane types is the field of foams, such as conventional flexible foams based on ether and ester poly-ols, cold-cure foams (frequently also referred to as HR foams), rigid foams, integral foams and microcellular foams, and also foams with properties between these classifications, for example semi-rigid systems. For instance, rigid foams are used as headlinings, ester foams are used as interior trim on doors with flame-laminated upholstery fabric and also for die-cut sun visors, and cold-cure and flexible foams are used for seating systems and instrument panels and also mat-tresses. However, adhesives and coatings are a further application where polyurethanes convince with their excep-tional properties.

However one problem with the production and storage of polyurethane foams is the release of aldehydes. Many con-sumers go out of their way to avoid using aldehyde-emitting products because of health concerns, however unjustified they may be.

Furthermore, in recent times especially the Chinese authorities have increased their requirements and specify very strict limits for interior emissions of cars marketed in China for example. The focus here is in turn not only on aromatic hydrocarbons but also on aldehydes. There is thus very generally a demand for polyurethane foams which release the smallest possible amount of aldehydes.

Different approaches have already been tried to satisfy this demand. WO 2009/117479 for instance proceeds on the assumption that the formaldehyde comes from raw material, more particularly suspecting it to be present in the amine catalysts used (which are tertiary amines). This reference proposes achieving low formaldehyde emissions by adding a primary amine to the tertiary amine catalyst. Preference is expressed for the use of dimethylaminopropylamine.

DE 10003156 A1 is not concerned directly with low-emission foams, but rather with the problem of developing polymers having excellent adsorption capabilities for vari-ous compounds, in particular for heavy metal ions. To solve this problem it proposes polyurethane foams containing ethyleneimine, polyethyleneimine, polyvinylamine, car-boxymethylated polyethyleneimines, phosphonomethylated polyethyleneimines, quaternized polyethyleneimines and/or dithiocarbamitized polyethyleneimines. These foams may also be used for adsorbing organic substances such as, for example, formaldehyde.

DE 10258046 A1 is concerned with the problem of producing polyurethane foams exhibiting a reduced content of formaldehyde emission. In contrast to DE 10003156 A1, the problem addressed by DE 10258046 A1 is therefore that of reducing the formaldehyde emissions from the PUR foam as such and not that of adsorbing formaldehyde from the ambient air. Proposed as the solution to this problem is a process that provides for addition of amino-containing poly-mers to the polyurethane foam, wherein the addition may take place before and/or during production of the polyure-thane foam.

However, it was found in EP 3459983 A1 that depending on the employed polyurethane formulation the use of alde-hyde-scavenging substances can result in foam defects and in some cases also have an effect on the efficiency of the aldehyde absorption.

SUMMARY

In the provision of polyurethanes, in particular polyure-thane foams, there therefore remains a need for further solutions which allow a reduction in aldehyde emission but exhibit no deterioration in respect of processability and have no negative effect on foam structure, in particular cell structure, nor on demouldability.

Against this backdrop a specific problem addressed by the present invention was that of enabling the provision of polyurethanes, in particular polyurethane foams, exhibiting reduced aldehyde emissions, wherein no deterioration in respect of processability and no negative effects on foam structure, in particular cell structure, nor on demouldability are observed. The interest of customers of being able to employ additives showing particularly good storage stabili-ties of at least 3 months should also be taken into account here in particular, wherein these additives suffer no visual and functional changes over this time.

DETAILED DESCRIPTION

It has now been found that, surprisingly, this problem is solved when the reaction is performed in the presence of a component A comprising a polyhydrazide, a polysemicar-bazide, a polysulfonyl hydrazide and/or carbodihydrazide, in particular a polyhydrazide, wherein the component A is employed in the form of a mixture C which further com-prises a component B containing a dispersion medium.

The present invention accordingly provides a process for producing polyurethane systems by reacting at least one polyol component with at least one isocyanate component in the presence of one or more catalysts which catalyze iso-cyanate-polyol and/or isocyanate-water and/or isocyanate trimerization reactions, wherein the reaction is performed in the presence of a component A comprising a polyhydrazide, a polysemicarbazide, a polysulfonyl hydrazide and/or carbodihydrazide, in particular a polyhydrazide, wherein the abovementioned component A is employed in the form of a mixture C, wherein this mixture C further comprises a component B, component B comprising a dispersion medium from the group of alkyl phthalates, alkyl dicarboxylates, alkyl adipates, alkyl sebacates, alkyl dodecanoates, polyesters, phosphate esters, fatty acid esters, straight-chain and modified natural oils or mineral oils, sulfonated oils, ethoxylated oils, epoxidized oils, fatty acids, sulfonamides, glycols, polyglycols, alkyl 1,2,4-benzenetricarboxylates and/or lecithin, in particular butyl diglycol, tris(decyl) 1,2,4-benzenetricarboxylate or diisononyl 1,2-cyclohexanedicarboxylate.

The subject matter of the present invention enables the provision of polyurethanes, in particular polyurethane foams, which exhibit reduced aldehyde emissions and for which no deterioration in respect of processability and no negative effects on foam structure, in particular cell structure, nor on demouldability are observed. The mixture C employed according to the invention comprising the components A and B has a particularly good storage stability of more than 3 months and suffers no visual nor functional changes upon extended storage.

In a particularly preferred embodiment of the invention the component A comprises a polyhydrazide, preferably oxalic dihydrazide, malonic dihydrazide, succinic dihydrazide, adipic dihydrazide, sebacic dihydrazide, dodecanoic dihydrazide, isophthalic dihydrazide, piperazine-N,N'-dihydrazide, m-benzenedihydrazide and/or p-benzenedihydrazide, in particular adipic dihydrazide and/or carbodihydrazide. Adipic dihydrazide is most preferred and provides particularly good results in the context of the invention.

In a further preferred embodiment of the invention the mixture C comprises not only the component A and the component B but also polyethylene glycol tridecyl ether phosphate, phosphate esters, organophosphates and/or polyether (mono)ols such as for example 2-ethylhexanol EO-PO polyether.

When the mixing ratio of component A to component B is 3:1 to 1:3, preferably 2:1 to 1:2, more preferably 1.5:1 to 1:1.5, in particular 1.1:1 to 1:1.1, this corresponds to a further preferred embodiment of the invention. These ratios are in parts by weight.

As already discussed, the subject matter of the invention allows the emission of aldehyde to be reliably minimized. However, a further particular advantage of the present invention is also that the mixture C employed in the process according to the invention provides the end-user with an important advantage since this mixture is very storage stable, i.e. deteriorates neither visually nor qualitatively, and thus reliably minimizes the emission of aldehyde even after storage over an extended period.

In this connection it has proven particularly advantageous when the component A is in the form of a ground material dispersed in the component B, and this corresponds to a preferred embodiment. Milling is to be understood as meaning the comminution of solids, in particular using or in a mill. One possible instrument that may be employed is a ball mill, for example a planetary ball mill. These are used anywhere that places the highest possible demands on fineness. The extremely high centrifugal forces in a planetary ball mill bring about the release of very high comminution energies and thus result in very short process times. The underlying comminution principles are based on impact and friction.

In process technology a dispersion is a heterogeneous mixture of at least two substances which are soluble in one another or chemically bond with one another only sparingly, if at all. One or more substances (disperse phase) are dispersed in another continuous substance (dispersion medium) in finely divided form. The individual phases may be clearly delimited from one another and may generally be re-separated from one another by physical methods (for example filtration, centrifugation).

It has especially proven advantageous when the particle size of the ground material or of the dispersion is from 0.5 to 200 μm, preferably from 0.5 to 60 μm, most preferably 0.5 to 30 μm, which corresponds to a preferred embodiment.

It has further proven advantageous when the process according to the invention has the feature that the mixture C is employed in a mass fraction of altogether 0.01 to 20 parts, preferably of 0.05 to 5 parts, in particular of 0.1 to 3 parts, based on 100 parts of polyol component.

It is particularly preferable when the polyurethane system produced is a polyurethane foam. A rigid polyurethane foam, a flexible polyurethane foam, a viscoelastic PU foam, an HR polyurethane foam, a semi-rigid polyurethane foam, a thermoformable polyurethane foam or a PU integral foam are particularly preferred.

The compounds employed according to the invention, the production thereof, the use of the compounds for producing the polyurethane system/foams and the polyurethane systems/foams themselves are hereinbelow described by way of example without any intention to limit the invention to these exemplary embodiments. Where ranges, general formulae or classes of compounds are specified below, these are intended to comprise not only the corresponding ranges or groups of compounds which are explicitly mentioned but also all subranges and subgroups of compounds which can be obtained by removing individual values (ranges) or compounds. Where documents are cited in the context of the present description, their content shall fully form part of the disclosure content of the present invention, particularly in respect of the matters referred to. Where figures are given in percent hereinbelow, these are percentages by weight unless otherwise stated. Average values specified hereinbelow are number averages unless otherwise stated. When properties of a material are referred to hereinbelow, for example viscosities or the like, the properties of the material at 25° C. are concerned, unless otherwise stated. When chemical (empirical) formulae are used in the present invention, the reported indices can be not only absolute numbers but also average values. For polymeric compounds, the indices preferably represent average values.

The production of the polyurethane systems may in principle be carried out in the customary manner and as described in the prior art. This is well known to a person skilled in the art. A comprehensive overview is found in, for example, G. Oertel, Polyurethane Handbook, 2nd edition, Hanser/Gardner Publications Inc., Cincinnati, Ohio, 1994, p. 177-247. When producing the polyurethane systems in accordance with the invention it is preferable when the mixtures C are employed in a mass fraction of 0.01 to 20 parts, preferably 0.05 to 5 parts and particularly preferably of 0.1 to 3 parts based on 100 parts of polyol component.

When performing the process according to the invention for producing the polyurethane systems it may be advantageous to additionally add water, physical blowing agents, flame retardants and/or further additives.

Any isocyanate may be used as isocyanate component in the process of the present invention, especially the aliphatic, cycloaliphatic, araliphatic and preferably aromatic polyfunctional isocyanates known per se. Suitable isocyanates in the context of the present invention preferably include any polyfunctional organic isocyanates, for example 4,4'-diphenylmethane diisocyanate (MDI), toluene diisocyanate (TDI), hexamethylene diisocyanate (HMDI) and isophorone diisocyanate (IPDI). The mixture of MDI and more highly condensed analogues having an average functionality of 2 to 4 known as crude MDI ("polymeric MDI") is particularly suitable, as well as the various isomers of TDI in pure form or as isomeric mixture. Mixtures of TDI and MDI are particularly preferred isocyanates. The bicyclic product of predominantly 2,4'- and 4,4'-isomer mixtures and their prepolymers known as "pure MDI" is also particularly suitable. MDI prepolymers are particularly suitable. Examples of particularly suitable isocyanates are detailed, for example, in EP 1712578, EP 1161474, WO 00/58383, US 2007/0072951, EP 1678232 and WO 2005/085310, which are hereby fully incorporated by reference.

All organic substances having two or more isocyanate-reactive groups, and also preparations thereof, are preferably useable as polyols suitable as polyol component for the purposes of this invention. Preferred polyols include all polyether polyols and polyester polyols typically used for production of polyurethane systems, especially polyurethane foams. The polyols preferably do not include compounds having at least one 5- or 6-membered ring constructed from one or two oxygen atoms and carbon atoms.

Polyether polyols are obtainable for example by reacting polyfunctional alcohols or amines with alkylene oxides. Polyester polyols are preferably based on esters of polybasic carboxylic acids (which may be either aliphatic, as in the case of adipic acid for example, or aromatic, as in the case of phthalic acid or terephthalic acid, for example) with polyhydric alcohols (usually glycols). Natural oil-based polyols (NOPs) may also be used. These polyols are obtained from natural oils such as soya or palm oil for example and may be used in the modified or unmodified state.

A further class of polyols are those obtained as prepolymers by reaction of polyol with isocyanate in a molar ratio of 100:1 to 5:1, preferably 50:1 to 10:1.

Yet a further class of preferably employable polyols is that of the so-called filled polyols (polymer polyols). These contain dispersed solid organic fillers up to a solids content of 40% by weight or more. Employable polyols include for example and inter alia:

SAN polyols: These are highly reactive polyols containing a dispersed copolymer based on styrene-acrylonitrile (SAN).

PUD polyols: These are highly reactive polyols containing polyurea, likewise in dispersed form.

PIPA polyols: These are highly reactive polyols containing a dispersed polyurethane, for example formed by in situ reaction of an isocyanate with an alkanolamine in a conventional polyol.

The solids content, which depending on the application may preferably be between 5% and >40% by weight based on the polyol, is responsible for improved cell opening, so that the polyol becomes controllably foamable, especially with TDI, and no shrinkage of the foams occurs. The solids thus act as an essential processing aid. A further function is to control the hardness via the solids content, since higher solids contents result in a higher hardness of the foam.

The formulations comprising solids-containing polyols have a markedly reduced inherent stability and therefore tend to require not only the chemical stabilization via the crosslinking reaction but also physical stabilization.

Depending on the solids contents of the polyols, these can be used for example alone or for example in a blend with the abovementioned unfilled polyols.

Preferably employable polyols are the so-called cell opener polyols. These are preferably polyether polyols having a high ethylene oxide proportion, namely preferably of at least 40% by weight, in particular of 50% to 100% by weight, based on the content of alkylene oxide.

An isocyanate component:polyol component ratio preferred in the context of the present invention and expressed as an index is in the range from 10 to 1000, preferably 40 to 350. This index describes the ratio of isocyanate actually used to calculated isocyanate (for a stoichiometric reaction with polyol). An index of 100 represents a molar reactive group ratio of 1:1.

Suitable catalysts for possible use in the process of the present invention are preferably substances which catalyze the gel reaction (isocyanate-polyol), the blowing reaction (isocyanate-water) or the di- or trimerization of the isocyanate. Typical examples are amines, e.g. triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol and bis(dimethylaminoethyl) ether, tin salts of organic carboxylic acids, tin compounds such as dibutyltin dilaurate and potassium salts such as potassium acetate. Further catalysts employed are preferably catalysts containing no organotin compounds, especially no dibutyltin dilaurate.

The amounts in which these catalysts are suitably used in the process of the present invention depend on the type of catalyst and typically range from 0.01 to 5 pphp (=parts by weight based on 100 parts by weight of polyol) or from 0.1 to 10 pphp in the case of potassium salts.

The amounts of water suitably present in the process of the present invention depend on whether or not physical blowing agents are used in addition to water. In the case of purely water-blown foams, the values typically range from preferably 1 to 20 pphp; when other blowing agents are used in addition, the amount of water used typically decreases to e.g. 0 or to the range from e.g. 0.1 to 5 pphp. To achieve high foam densities, preferably neither water nor any other blowing agent is used.

Suitable physical blowing agents in the context of the present invention are gases, for example liquefied $CO_2$, and volatile liquids, for example hydrocarbons having 4 or 5 carbon atoms, preferably cyclo-, iso- and n-pentane, hydrofluorocarbons, preferably HFC 245fa, HFC 134a and HFC 365mfc, but also olefinic hydrofluorocarbons such as HHO 1233zd or HHO1336mzzZ, hydrochlorofluorocarbons, preferably HCFC 141b, oxygen-containing compounds such as methyl formate and dimethoxymethane, or hydrochlorocarbons, preferably dichloromethane and 1,2-dichloroethane. Suitable blowing agents further include ketones (e.g. acetone) or aldehydes (e.g. methylal).

Employable stabilizers include the substances mentioned in the prior art. The compositions of the present invention may advantageously contain one or more stabilizers. They are in particular silicon compounds comprising carbon atoms and preferably selected from polysiloxanes, polydimethylsiloxanes, organomodified polysiloxanes, polyether-modified polysiloxanes and polyether-polysiloxane copolymers.

Useful silicon compounds comprising one or more carbon atoms include the substances mentioned in the prior art.

Preference is given to using such silicon compounds as are particularly suitable for the particular type of foam. Suitable siloxanes are described for example in the following references: EP 0839852, EP 1544235, DE 102004001408, WO 2005/118668, US 2007/0072951, DE 2533074, EP 1537159, EP 533202, U.S. Pat. No. 3,933,695, EP 0780414, DE 4239054, DE 4229402, EP 867465. The production of the silicon compounds may be carried out as described in the prior art. Suitable examples are described, for instance, in U.S. Pat. No. 4,147,847, EP 0493836 and U.S. Pat. No. 4,855,379.

Organomodified silicon compounds can be used in particular. Useful organomodified silicon compounds which are particularly preferred include, for example, those conforming to the following formula (IV):

$$M_k D_m D'_n T_o Q_p \tag{IV}$$

where $M = [R^2 R^1_2 SiO_{1/2}]$ $D = [R^1 R^1 SiO_{2/2}]$ $D' = [R^3 R^1 SiO_{2/2}]$ $T = [R^1 SiO_{3/2}]$ $Q = [SiO_{4/2}]$ $k = 0$ to 22, preferably 2 to 10, more preferably 2

$m = 0$ to 400, preferably 0 to 200, more preferably 2 to 100

$n = 0$ to 50, preferably 0.5 to 20, more preferably 0.7 to 9

$o = 0$ to 10, preferably 0 to 5, more preferably 0

$p = 0$ to 10, preferably 0 to 5, more preferably 0

$R^2 = R^1$ or $R^3$ $R^1 =$ independently of one another alkyl or aryl radicals or H, preferably methyl, ethyl, propyl or phenyl, preferably methyl or phenyl $R^3 =$ organic modifications e.g. polyethers or a monovalent moiety of 1 to 30 carbon atoms with at least one heteroatom selected from the group N, S, O, P, F, Cl, Br.

The $R^3$ in formula (IV) are preferably moieties from the group

—CH$_2$CH$_2$CH$_2$O[CH$_2$CH$_2$O]$_a$[CH$_2$CH(CH$_3$)O]$_b$ [CHR$^4$CHR$^4$O]$_c$R$^5$

—CH$_2$CH$_2$CH$_2$CN

—CH$_2$CH$_2$CF$_3$

—CH$_2$CH$_2$CH$_2$Cl where $R^5 =$ alkyl, aryl, urethane, carboxyl, silyl or H, preferably H, -Me, or —C(O)Me $R^4 =$ alkyl, aryl, which may optionally be interrupted by oxygen, especially preferably H, Me, Et or Ph, $a = 0$ to 100, preferably 0.5 to 70, more preferably 1-40

$b = 0$ to 100, preferably 0.5 to 70, more preferably 0-40

$c = 0$ to 50, preferably 0 to 15, more preferably 0

$a + b + c > 3$.

Unmodified silicon compounds can be used in particular. Particularly preferred employable unmodified silicon compounds include, for example, those conforming to the following formula (V):

$$M_q D_r \tag{V}$$

where

M and D are as defined for above formula (IV), and $q = 2$ $r = 0$ to 50, preferably 1 to 40, more preferably 2 to 30.

The abovementioned silicon compounds, especially of formula (IV) and/or (V), may particularly preferably be used individually or in combination with one another. A compatibilizer may additionally be used in the case of mixtures. This compatibilizer may be selected from the group of aliphatic or aromatic hydrocarbons, more preferably aliphatic polyethers or polyesters.

It may be advantageous for at least 10% by equivalence (and at most 50% by equivalence) of the $R^2$ moieties in the siloxane compounds of formula (IV) to be alkyl groups of 8 to 22 carbon atoms (based on the overall number of R2 moieties in the siloxane compound).

From 0.00001 to 20 parts by mass of silicon compounds may preferably be used per 100 parts by mass of polyol components.

It is especially when the aforementioned silicon compounds are used in combination with the mixtures C to be used according to the present invention that very good results are made possible with regard to the polyurethanes sought according to the present invention.

In addition to or in lieu of water and any physical blowing agents, the additive composition of the present invention may also include other chemical blowing agents that react with isocyanates with gas evolution, examples being formic acid, carbamates or carbonates.

Suitable optional flame retardants for the purposes of the present invention are preferably liquid organophosphorus compounds, such as halogen-free organic phosphates, e.g. triethyl phosphate (TEP), halogenated phosphates, e.g. tris (1-chloro-2-propyl) phosphate (TCPP) and tris(2-chloro-ethyl) phosphate (TCEP), and organic phosphonates, e.g. dimethyl methanephosphonate (DMMP), dimethyl propane-phosphonate (DMPP), or solids such as ammonium poly-phosphate (APP) and red phosphorus. Suitable flame retardants further include halogenated compounds, for example halogenated polyols, and also solids such as expandable graphite and melamine.

The process according to the invention makes it possible to produce polyurethane systems, in particular polyurethane foams, that have particularly low aldehyde emissions coupled with good processability.

In the context of the present invention the term polyurethane is to be understood in particular as a generic term for a polymer produced from di- or polyisocyanates and polyols or other isocyanate-reactive species, such as amines for example, wherein the urethane bond need not be the only or predominant type of bond. Polyisocyanurates and polyureas are also expressly included.

The production according to the invention of polyurethane systems, in particular polyurethane foams, and the production of the polyurethane systems/polyurethane foams may be effected by any process known to a person skilled in the art, for example by hand mixing or preferably using high-pressure or low-pressure foaming machines. The process according to the invention may be performed continuously or batchwise. Batchwise performance of the process is preferable in the production of moulded foams, refrigerators, footwear soles or panels. A continuous process is preferable for producing insulation panels, metal composite elements, slabs or for spraying techniques.

In the process according to the invention the mixtures C employed according to the invention may preferably be admixed immediately before or else only during the reaction (to form the urethane bonds). The combining/metered addition of the combination is preferably carried out in a mixing head and also in a batch process for ready-to-use polyol systems.

The present invention further provides a polyurethane system, preferably polyurethane foam, produced by a process according to the invention as described hereinabove.

The polyurethane systems according to the invention may preferably comprise 0.001% to 20% by weight, advantageously 0.005% to 5% by weight, in particular 0.01 to 3% by weight based on the total composition of the polyurethane system of a total amount of the mixture C.

The polyurethane systems according to the invention may preferably be a polyurethane foam, in particular for example a rigid polyurethane foam, a flexible polyurethane foam, a viscoelastic foam, an HR foam, a semi-rigid polyurethane foam, a thermoformable polyurethane foam or an integral foam, preferably an HR polyurethane foam.

The polyurethane systems, preferably polyurethane foams, according to the invention may be used for example as refrigerator insulation, insulation panels, sandwich elements, pipe insulation, spray foam, 1- and 1.5-component can foam (a 1.5-component can foam is a foam that is produced by destroying a container in the can), imitation wood, modelling foam, packaging foam, mattresses, furniture cushioning, automotive seat cushioning, headrests, instrument panels, automotive interior trim, automotive headlining, sound absorption material, steering wheels, shoe soles, carpet backing foam, filter foam, sealing foam, sealants and adhesives, binders or lacquers for producing corresponding products.

The invention further provides a composition for producing polyurethane foam comprising at least one urethane and/or isocyanurate catalyst, at least one blowing agent, at least one isocyanate component and at least one polyol component, wherein a mixture C is present as an additive, where mixture C is as described hereinabove. Especially with respect to the mixture C reference is made to the foregoing in its entirety for avoidance of repetition.

In the present context the term composition also comprises multicomponent compositions in which two or more components must be mixed to generate a chemical reaction resulting in production of polyurethane foam. In the present context the term composition especially comprises the mixture of at least one urethane and/or isocyanurate catalyst, at least one blowing agent, at least one isocyanate component and a mixture C as described hereinabove.

A preferred composition according to the invention for producing polyurethane foam may contain polyol in amounts of 25% to 75% by weight for example, water in amounts of 1% to 7% by weight for example, catalyst in amounts of 0.05% to 3% by weight for example, physical blowing agent in amounts of 0% to 25% by weight for example (e.g. 0.1% to 25% by weight), stabilizers (e.g. silicon-containing and non-silicon-containing, in particular silicon-containing and non-silicon-containing organic stabilizers and surfactants) in amounts of 0.3% to 5% by weight for example, isocyanate in amounts of 20% to 50% by weight for example and the mixture C to be employed according to the invention in amounts of 0.001% to 20% by weight for example (preferably 0.005% to 5% by weight).

Having regard to preferred embodiments of these above-mentioned compositions, reference is made to the description hereinabove especially with respect to the mixture C.

The invention further provides a process for reducing the total aldehyde emission, in particular aldehyde emissions comprising formaldehyde and acetaldehyde, from polyurethane systems, especially polyurethane foams, by addition of mixture C (mixture C as described hereinabove) to the polyurethane system, in particular polyurethane foam, preferably in an amount of 0.001% to 20% by weight, advantageously 0.005% to 5% by weight, in particular 0.01% to 3% by weight, based on the total weight of the polyurethane system, in particular polyurethane foam, wherein the addition may be effected before and/or during production of the polyurethane system, in particular of the polyurethane foam.

The present invention further provides a polyurethane system (in particular a polyurethane foam) containing mixture C as described hereinabove in an amount of preferably 0.001% to 20% by weight, advantageously 0.005% to 5% by weight, especially 0.01% to 3% by weight based on the overall weight of the polyurethane system (in particular polyurethane foam), especially obtainable by addition of mixture C before and/or during production of the polyurethane system, in particular polyurethane foam.

The invention further provides for the use of mixture C as described hereinabove for producing polyurethane foams that have low emissions with regard to aldehydes, preferably comprising formaldehyde and acetaldehyde. The invention further provides for the use of mixture C as described hereinabove for reducing the emissions of aldehydes, preferably comprising formaldehyde and acetaldehyde, from polyurethane foams compared to polyurethane foams produced otherwise identically but without the use of the mixture C.

The invention further provides for the use of a mixture C, in particular as described hereinabove, for reducing aldehyde emissions, in particular comprising formaldehyde and acetaldehyde, from polyurethane systems, in particular polyurethane foams.

The examples which follow describe the present invention by way of example, without any intention of restricting the invention, whose scope is apparent from the entirety of the description and the claims, to the embodiments recited in the examples.

EXAMPLES

TABLE 1

Solutions and dispersions

| Additive | Description |
| --- | --- |
| Solution 1* | 10% adipic dihydrazide (TNJ, China) in water |
| Dispersion 1** | 50% adipic dihydrazide dispersed in tris(decyl) 1,2,4-benzenetricarboxylate. |

*Freshly made-up solution was employed. Production of an aqueous solution containing 10% adipic hydrazide required the solution to be heated to 40-45° C. for approximately 30 min. However, even at 60° C. the solubility of the active substance was not 100%. When this solution was stored at room temperature the precipitation of a precipitate was observable. Accordingly a freshly made-up solution was employed.
**Adipic dihydrazide was mixed with tris(decyl) 1,2,4-benzenetricarboxylate in a 1:1 ratio in the presence of 0.5% polyethylene glycol tridecyl ether phosphate and sheared in a Dispermat ball mill at 5000 rpm for about 1.5 hours.

TABLE 2

Employed raw materials for production of the foams

| | |
| --- | --- |
| Polyol 1 | Trifunctional polyetherol, MW 6000, Covestro AG |
| Polyol 2 | Trifunctional polyetherol, MW 4500, Dow Chemicals |
| Crosslinker | Tegoamin DEOA pure (diethanolamine 100%), Overlack GmbH |
| Catalyst 1 | DABCO NE 300 (N-[2-[2-(dimethylamino)ethoxy] ethyl]-N-methyl-1,3-propanediamine), Evonik Industries AG |
| Catalyst 2 | DABCO NE 1082 (1,3-bis[3-(dimethylamino)propyl]urea, N'-[3-(dimethylamino)propyl]-N,N-dimethylpropane-1,3-diamine, Evonik Industries AG |
| Silicone stabilizer | TEGOSTAB B 8715 LF 2, Evonik Industries AG |
| Isocyanate | Methylene diisocyanate, Suprasec 2447, NCO = 32.7%, Huntsman |

Example 1

Production of the Dispersions

Adipic dihydrazide was mixed with tris(decyl) 1,2,4-benzenetricarboxylate in a 1:1 ratio in the presence of 0.5% polyethylene glycol tridecyl ether phosphate and sheared in a Dispermat ball mill (planetary ball mill) (manufacturer: Retsch, model: PM 100) at 5000 rpm for about 1.5 hours.

Production of Polyurethane Foams

Foaming was carried out by manual mixing. To this end polyol, crosslinker, catalyst, additive, water and silicone stabilizer were weighed into a beaker, cf. table 3, and premixed with a wing stirrer at 1000 rpm for 60 s. The isocyanate was then added and mixed in at a stirrer speed of 2500 rpm for 7 s. The reaction mixture was filled into a box mould temperature-controlled to 57° C. (dimensions 40×40× 10 cm) and the box was sealed. The finished foam was demoulded after 3.5 minutes. The employed materials and usage amounts are shown in Table 3.

Moulded foams produced by the method described above were then analyzed for their formaldehyde and acetaldehyde content in line with VDA 275 (VDA 275 "Mouldings for the Automotive Interior—Determination of Formaldehyde Evolution." Measurement by the modified bottle method; source: VDA 275, July 1994, www.vda.de).

Spiking the Foams

Since the employed input materials of the polyurethane formulation provide only relatively low acetaldehyde emissions after foaming, these are admixed with 30 ppm of acetaldehyde to allow measurement of an elevated starting value and provision of meaningful data about the reduction in aldehyde emissions, thus demonstrating the effectiveness of the active substance. The results from foam V1 in table 3 are used as reference values for formaldehyde and acetaldehyde.

Measurement Principle

Test specimens having a certain mass and size were secured above distilled water in a sealed 1 L glass bottle and stored for a defined period at constant temperature. The bottles were then cooled and the absorbed formaldehyde and acetaldehyde in the distilled water were determined. The determined formaldehyde and acetaldehyde amount was related to dry moulding weight (mg/kg).

Analysis

Test Specimen: Sample Preparation, Sampling and Specimen Dimensions

Once demoulded, the foams were stored at 21° C. and about 50% relative humidity for 24 hours. Specimens were then removed at suitable and representative points distributed uniformly across the width of the (cooled) moulding. The foams were then wrapped in an aluminium foil and sealed in a polyethylene bag.

The specimens each had dimensions of 100×40×40 mm thickness (about 9 g). 3 specimens per moulding were removed for aldehyde determination.

Test Procedure: Formaldehyde/Acetaldehyde Release

Immediately after obtaining the sealed test specimens, these were sent for direct determination. The samples were weighed to an accuracy of 0.001 g on an analytical balance before analysis. 50 ml of distilled water were pipetted into each of the glass bottles used. Once the test specimens were secured in the glass bottle, the vessel was sealed and stored in a heating cabinet for 3 hours at a constant temperature of 60° C. The vessels were removed from the heating cabinet once the test period had elapsed. After standing at room temperature for 60 minutes, the test specimens were removed from the test bottle. This was followed by derivatization by the DNPH method (dinitrophenylhydrazine). To this end 900 μl of the water phase is admixed with 100 μl of a DNPH solution. The DNPH solution is prepared as follows: 50 mg of DNPH in 40 ml of MeCN (acetonitrile) are acidulated with 250 μl of dilute HCl (1:10) and made up to 50 ml with MeCN. Once derivatization is complete a sample is analyzed by HPLC. The sample is separated into the individual aldehyde homologues.

HPLC Instrument Parameters

The following instrument was used for the analysis:

Agilent Technologies 1260

Chromatography column: Phenomenex Luna 250*4.6 mm C18, 5μ particle size

Eluent: water acetonitrile gradient

Detection: UV 365 nm

TABLE 3

Formulation for producing the mouldings and results of the formaldehyde and acetaldehyde measurements as well as foam properties such rigidity and processability

|  | V1 | V2 | E1 | E2 |
|---|---|---|---|---|
| Polyol A | 100 | 100 | 100 | 100 |
| Polyol B | 1.3 | 1.3 | 1.3 | 1.3 |
| Crosslinker | 0.59 | 0.59 | 0.59 | 0.59 |
| Added water | 3.51 | 0 | 3.51 | 3.51 |
| Total water | 3.51 | 3.51 | 3.51 | 3.51 |
| Catalyst 1 | 0.2 | 0.2 | 0.2 | 0.2 |
| Catalyst 2 | 0.8 | 0.8 | 0.8 | 0.8 |
| Silicone stabilizer | 1 | 1 | 1 | 1 |
| Isocyanate, index 95 | 56.9 | 55.8 | 55.8 | 55.8 |
| Solution 1 | — | 3.90 | — | — |
| Dispersion 1 | — | — | 0.78 | 1.00 |
| Content of active substance [pphp] | 0 | 0.39 | 0.39 | 0.50 |
| Formaldehyde emissions ppm (VDA 275, mod.) | 0.77 | 0.15 | 0.16 | 0.08 |
| Acetaldehyde emissions, ppm (VDA 275, mod.) | 0.68 | 0.56 | 0.57 | 0.31 |
| Processability | OK | OK | OK | OK |
| Cell count [cells/cm] | 14 | 14 | 14 | 14 |

The reported amounts of raw materials are in grams.

Description of Results:

Employing dispersion 1 in the abovementioned foam formulation shows that at identical active substance content a comparably good effect in the foam in terms of reducing formaldehyde and acetaldehyde emissions is achievable both with the aqueous solution 1 (V2) and with the dispersion 1 (E1). Processability in the foam is very good for both administration forms. There is no negative effect on foam structure, in particular cell structure, nor on demouldability. Increasing the active substance concentration in the foam of dispersion 1 (E2) resulted in even lower values for formaldehyde and acetaldehyde while processing properties remained unchanged.

However, the use of the aqueous solution 1 (V2) proved extremely disadvantageous in respect of handling, reproducibility and storage stability.

Production of an aqueous solution containing 10% adipic dihydrazide required the solution to be heated to 40-45° C. for approximately 30 min. However, even at 60° C. the solubility of the active substance was not 100%. When this solution was stored at room temperature precipitation of a precipitate was observable at the latest after about 10 days. Despite attempts to minimize precipitation of the precipitate, for example through a lower active substance content (higher water proportion) for the same procedure, it remained the case that a white finely crystalline precipitate was formed at the latest after about 10 days. The adipic dihydrazide thus proved not to be storage stable at all in aqueous solution and reproducible results thus could not be achieved unless the aqueous solution was in each case freshly prepared from scratch and used immediately.

In addition, in this further attempt the water contents present were excessively large at 0.99 parts when using the aqueous solution in the product and the water contents used in the above-described formulation in table 3 (see total water 3.51 parts) could thus no longer be observed. The aldehyde scavenger would thus introduce water contents into the system such that the density of the foam falls below the target foam density, which in turn also leads to instability.

It is also not possible to pass such a product on to customers using very low water contents, examples being systems for steering wheels made of micro-cellular polyurethane applications which typically have water contents of not more than 1%. To avoid this problem the concentration of the active substance content was increased with the result that the precipitation of the finely crystalline precipitate was even more serious and occurred even more rapidly. Storage stability and reproducibility were thus even more inadequate.

By contrast, the inventive dispersion 1 proved extremely storage-stable and even after storage showed no visual and functional changes, instead consistently achieving particularly reproducible results.

The invention claimed is:

1. A process for producing polyurethane systems by reacting at least one polyol component with at least one isocyanate component in the presence of one or more catalysts which catalyze isocyanate-polyol and/or isocyanate-water and/or isocyanate trimerization reactions, wherein the reaction is performed in the presence of a component A comprising a polyhydrazide, a polysemicarbazide, a polysulfonyl hydrazide and/or carbodihydrazide, wherein the component A is employed in the form of a mixture C which further comprises a component B comprising a dispersion medium from the group of alkyl phthalates, alkyl dicarboxylates, alkyl adipates, alkyl sebacates, alkyl dodecanoates, polyesters, phosphate esters, fatty acid esters, straight-chain and modified natural oils or mineral oils, sulfonated oils, ethoxylated oils, epoxidized oils, fatty acids, sulfonamides, glycols, polyglycols, alkyl 1,2,4-benzenetricarboxylates and/or lecithin.

2. The process according to claim 1, wherein component A comprises a polyhydrazide.

3. The process according to claim 1, wherein the mixture C further comprises polyethylene glycol tridecyl ether phosphate, phosphate esters, organophosphates and/or polyether (mono)ols.

4. The process according to claim 1, wherein the mixing weight ratio of component A to component B is 3:1 to 1:3.

5. The process according to claim 1, wherein the component A is in the form of a ground material dispersed in the component B.

6. The process according to claim 5, wherein the particle size of the ground material or of the dispersion is from 0.01 to 200 μm.

7. The process according to claim 1, wherein the mixture C is employed in a mass fraction of altogether 0.01 to 20 parts based on 100 parts of polyol component.

8. The process according to claim 1, wherein the polyurethane system produced is a polyurethane foam selected from the group consisting of a rigid polyurethane foam, a flexible polyurethane foam, a viscoelastic PU foam, an HR polyurethane foam, a semi-rigid polyurethane foam, a thermoformable polyurethane foam and a PU integral foam.

9. The process according to claim 1, wherein component A comprises a polyhydrazide is selected from the group consisting of oxalic dihydrazide, malonic dihydrazide, succinic dihydrazide, adipic dihydrazide, sebacic dihydrazide, dodecanoic dihydrazide, isophthalic dihydrazide, piperazine-N,N'-dihydrazide, m-benzenedihydrazide and p-benzenedihydrazide.

10. The process according to claim 1, wherein the mixture C further comprises a polyether (mono)ol which is 2-ethylhexanol EO-PO polyether.

11. The process according to claim 1, wherein the mixing weight ratio of component A to component B is 1:5 to 1:1.5.

12. The process according to claim 5, wherein the particle size of the ground material or of the dispersion is from 0.1 to 30 μm.

13. The process according to claim 1, wherein the mixture C is employed in a mass fraction of altogether 0.1 to 3 parts based on 100 parts of polyol component.

14. The process according to claim 1, wherein the polyol is at least one selected from the group consisting of a polyether polyol, a polyester polyol, and a polymer polyol.

* * * * *